(12) United States Patent
Gray, Jr.

(10) Patent No.: US 8,177,009 B2
(45) Date of Patent: May 15, 2012

(54) INDEPENDENT DISPLACEMENT OPPOSING PUMP/MOTORS AND METHOD OF OPERATION

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 1330 days.

(21) Appl. No.: 11/233,822

(22) Filed: Sep. 22, 2005

(65) Prior Publication Data

US 2006/0021813 A1    Feb. 2, 2006

Related U.S. Application Data

(63) Continuation-in-part of application No. 10/620,726, filed on Jul. 15, 2003, now Pat. No. 7,374,005, which is a continuation-in-part of application No. 09/479,844, filed on Jan. 10, 2000, now Pat. No. 6,719,080.

(51) Int. Cl.
*B60K 25/10* (2006.01)
(52) U.S. Cl. .................... 180/165; 180/307
(58) Field of Classification Search ............ 180/65.2, 180/65.3, 65.4, 165, 305, 307, 308; 60/414, 60/416, 417, 425
See application file for complete search history.

(56) References Cited

U.S. PATENT DOCUMENTS

| | | | |
|---|---|---|---|
| 2,875,701 A | 3/1959 | Ebert | 103/162 |
| 2,956,407 A | 10/1960 | Grabow | 60/53 |
| 3,081,647 A | 3/1963 | Blenkle | 74/710.5 |
| 3,419,096 A | 12/1968 | Zagotta | |
| 3,442,181 A | 5/1969 | Olderaan | 92/57 |
| 3,760,692 A | 9/1973 | Molly | 91/505 |
| 3,900,075 A | 8/1975 | Chichester et al. | 180/6.3 |
| 3,960,284 A | 6/1976 | Carpenter | 214/138 R |
| 3,978,937 A | 9/1976 | Chichester et al. | 180/44 F |
| 3,990,235 A | 11/1976 | Bauchet | |
| 3,999,466 A | 12/1976 | Aschke | 91/499 |
| 4,018,052 A | 4/1977 | Laussermair | 60/414 |
| 4,075,843 A | 2/1978 | Leker | 60/487 |

(Continued)

FOREIGN PATENT DOCUMENTS

CH    325587    12/1957

(Continued)

OTHER PUBLICATIONS

Fendt Vario TMS, as Illustrated in the Enclosed Photos and Printed Publications, Apr. 2003.

*Primary Examiner* — J. Allen Shriver, II
*Assistant Examiner* — Bridget Avery
(74) *Attorney, Agent, or Firm* — Seed IP Law Group, PLLC

(57) ABSTRACT

A hydraulic machine includes first and second opposing motors. Displacement of the first and second motors is controlled such that while the sum of the displacements of the first and second motors is below a threshold, the displacement of the first motor is substantially equal to the sum, and the displacement of the second motor is substantially equal to zero. While the sum of the displacements is above the threshold, the displacement of the first motor may be substantially equal to the displacement of the second motor, either as a displacement percentage or as a displacement volume. The first motor may be equal in capacity, or smaller than the second motor.

43 Claims, 7 Drawing Sheets

U.S. PATENT DOCUMENTS

| | | | | |
|---|---|---|---|---|
| 4,098,083 | A | | 7/1978 | Carman .................. 60/414 |
| 4,098,144 | A | | 7/1978 | Besel et al. .............. 74/687 |
| 4,129,102 | A | | 12/1978 | van der Lely ............ 123/51 B |
| 4,223,532 | A | | 9/1980 | Shiber ..................... 60/414 |
| 4,252,508 | A | | 2/1981 | Forster .................... 417/429 |
| 4,271,725 | A | | 6/1981 | Takao et al. .............. 74/730 |
| 4,285,303 | A | | 8/1981 | Leach ..................... 123/51 BA |
| 4,354,144 | A | * | 10/1982 | McCarthy ................ 318/13 |
| 4,355,506 | A | | 10/1982 | Leonard .................. 60/389 |
| 4,399,886 | A | * | 8/1983 | Pollman .................. 180/197 |
| 4,487,108 | A | | 12/1984 | McLuen ................... 91/504 |
| 4,495,768 | A | | 1/1985 | Valavaara ................ 60/414 |
| 4,669,267 | A | | 6/1987 | Greenhow ................ 60/490 |
| 4,747,266 | A | | 5/1988 | Cadée ..................... 60/325 |
| 4,763,472 | A | * | 8/1988 | McGowan ................ 60/403 |
| 4,770,084 | A | | 9/1988 | Miwa et al. .............. 91/501 |
| 4,813,234 | A | | 3/1989 | Nikolaus .................. 60/484 |
| 4,872,394 | A | | 10/1989 | Nakagawa et al. ....... 91/506 |
| 4,888,949 | A | | 12/1989 | Rogers .................... 60/434 |
| 4,896,564 | A | | 1/1990 | Eickmann ................ 74/682 |
| 5,207,060 | A | | 5/1993 | Sheets |
| 5,403,244 | A | | 4/1995 | Tankersley et al. ....... 477/20 |
| 5,406,794 | A | * | 4/1995 | Litz .......................... 60/483 |
| 5,435,794 | A | | 7/1995 | Mori et al. ............... 475/343 |
| 5,495,912 | A | | 3/1996 | Gray, Jr. et al. .......... 180/165 |
| 5,505,527 | A | | 4/1996 | Gray, Jr. et al. .......... 303/3 |
| 5,507,144 | A | | 4/1996 | Gray, Jr. et al. .......... 60/327 |
| 5,549,087 | A | | 8/1996 | Gray, Jr. et al. .......... 123/254 |
| 5,562,079 | A | | 10/1996 | Gray, Jr. .................. 123/276 |
| 5,579,640 | A | | 12/1996 | Gray, Jr. et al. .......... 60/413 |
| 5,599,163 | A | | 2/1997 | Heath et al. .............. 415/55.1 |
| 5,609,131 | A | | 3/1997 | Gray, Jr. et al. .......... 123/299 |
| 5,611,300 | A | | 3/1997 | Gray, Jr. .................. 123/48 A |
| 5,617,823 | A | | 4/1997 | Gray, Jr. et al. .......... 23/254 |
| 5,802,851 | A | | 9/1998 | Krantz ..................... 60/487 |
| 5,818,116 | A | * | 10/1998 | Nakae et al. ............. 290/38 R |
| 5,827,148 | A | | 10/1998 | Seto et al. ................ 477/15 |
| 5,845,732 | A | | 12/1998 | Taniguchi et al. ........ 180/65.6 |
| 5,887,674 | A | | 3/1999 | Gray, Jr. .................. 180/307 |
| 5,967,927 | A | | 10/1999 | Imamura et al. ......... 475/83 |
| 5,971,092 | A | | 10/1999 | Walker .................... 180/308 |
| 5,993,351 | A | * | 11/1999 | Deguchi et al. .......... 477/5 |
| 6,018,694 | A | * | 1/2000 | Egami et al. ............. 701/102 |
| 6,107,761 | A | | 8/2000 | Seto et al. ................ 318/139 |
| 6,170,524 | B1 | | 1/2001 | Gray, Jr. .................. 137/625.18 |
| 6,186,126 | B1 | | 2/2001 | Gray, Jr. .................. 123/557 |
| 6,189,493 | B1 | | 2/2001 | Gray, Jr. .................. 123/52.4 |
| 6,202,416 | B1 | | 3/2001 | Gray, Jr. .................. 60/620 |
| 6,208,034 | B1 | * | 3/2001 | Yamaguchi .............. 290/40 C |
| 6,213,727 | B1 | | 4/2001 | Kawaguchi .............. 417/222.2 |
| 6,216,462 | B1 | | 4/2001 | Gray, Jr. .................. 60/616 |
| 6,260,468 | B1 | | 7/2001 | Ryken et al. ............. 91/506 |
| 6,272,950 | B1 | | 8/2001 | Braun et al. .............. 74/731.1 |
| 6,283,009 | B1 | | 9/2001 | Hayashi et al. .......... 92/71 |
| 6,301,888 | B1 | | 10/2001 | Gray, Jr. .................. 60/605.2 |
| 6,301,891 | B2 | | 10/2001 | Gray, Jr. .................. 60/616 |
| 6,358,174 | B1 | | 3/2002 | Folsom et al. ........... 475/72 |
| 6,375,592 | B1 | | 4/2002 | Takahashi et al. ....... 475/262 |
| 6,415,607 | B1 | | 7/2002 | Gray, Jr. .................. 60/616 |
| 6,499,549 | B1 | | 12/2002 | Mizon et al. ............. 180/65.6 |
| 6,575,872 | B2 | | 6/2003 | Gluck et al. ............. 477/68 |
| 6,589,128 | B2 | | 7/2003 | Bowen .................... 475/5 |
| 6,626,785 | B2 | | 9/2003 | Pollman ................... 475/82 |
| 6,626,787 | B2 | | 9/2003 | Porter ..................... 475/221 |
| 6,628,021 | B2 | | 9/2003 | Shinohara et al. ....... 310/68 B |
| 6,684,970 | B2 | * | 2/2004 | Gotou ..................... 180/65.225 |
| 6,876,098 | B1 | | 4/2005 | Gray, Jr. .................. 290/40 D |
| 2002/0094909 | A1 | | 7/2002 | Gluck et al. ............. 477/52 |
| 2003/0207733 | A1 | | 11/2003 | Ishimaru et al. ......... 475/83 |
| 2004/0011031 | A1 | | 1/2004 | Gray, Jr. .................. 60/325 |
| 2004/0173089 | A1 | | 9/2004 | Gray, Jr. et al. .......... 91/505 |
| 2004/0178635 | A1 | | 9/2004 | Gray, Jr. .................. 290/40 C |
| 2004/0251064 | A1 | * | 12/2004 | Imai ........................ 180/65.2 |
| 2004/0251067 | A1 | | 12/2004 | Gray, Jr. et al. .......... 180/165 |
| 2005/0193888 | A1 | | 9/2005 | Gray, Jr. .................. 91/472 |

FOREIGN PATENT DOCUMENTS

| | | |
|---|---|---|
| DE | 1 528 469 | 4/1971 |
| DE | 2 101 963 | 7/1972 |
| DE | 26 49 127 | 5/1978 |
| DE | 42 28 294 A1 | 3/1993 |
| EP | 0 417 820 B1 | 6/1995 |
| EP | 1 092 870 A2 | 4/2001 |
| EP | 1 114 948 A2 | 7/2001 |
| GB | 992334 | 5/1965 |
| JP | 2001-47287 | 2/2001 |
| WO | WO 01/51870 A1 | 7/2001 |
| WO | 2005/014324 A2 | 2/2005 |

* cited by examiner

US 8,177,009 B2

INDEPENDENT DISPLACEMENT OPPOSING PUMP/MOTORS AND METHOD OF OPERATION

CROSS-REFERENCE TO RELATED APPLICATIONS

This application is a continuation-in-part of U.S. patent application Ser. No. 10/620,726, filed Jul. 15, 2003, now pending. U.S. patent application Ser. No. 10/620,726 is a continuation-in-part of U.S. patent application Ser. No. 09/479,844, filed Jan. 10, 2000, now issued as U.S. Pat. No. 6,719,080. These applications are incorporated herein by reference in their entireties.

BACKGROUND OF THE INVENTION

1. Field of the Invention

The present disclosure is related to hydraulic pump/motors operating opposite one another, and in particular to independent control of opposed pump/motors for improved operational efficiency.

2. Description of the Related Art

In recent years, significant interest has been generated in hybrid vehicle technology as a way to improve fuel economy and reduce the environmental impact of the large number of vehicles in operation. The term hybrid is used in reference to vehicles employing two or more power sources to provide motive energy to the vehicle. For example, hybrid electric vehicles are currently available that employ an internal combustion engine to provide power to a generator, which then generates electricity to be stored in a battery of storage cells. This stored power is then used, as necessary, to drive an electric motor coupled to the drive train of the vehicle.

There is also interest in the development of hybrid hydraulic vehicles, due to the potential for greater fuel economy, and a lower environmental impact than hybrid electric vehicles. According to one configuration, a hybrid hydraulic vehicle employs an internal combustion engine (ICE) to drive a hydraulic pump, which pressurizes hydraulic fluid. The pressurized fluid is stored in an accumulator and later used to drive a hydraulic motor coupled to the drive wheels of the vehicle.

Hydraulic hybrid vehicles and their operation is described in a number of references, including U.S. Pat. No. 5,495,912 and U.S. patent application Ser. Nos. 10/386,029; 10/672,732; and 10/769,459. Each of the above listed references is incorporated herein by reference in its entirety.

There is a class of hydraulic machines commonly employed in hybrid operation that includes a rotating barrel having a plurality of cylinders, and pistons reciprocating within the cylinders. The barrel is configured to rotate over a valve plate having inlet and outlet ports. The barrel rotates over the valve plate, and fluid passes into, and out of, the cylinders of the barrel. In a hydraulic pump, fluid is drawn into each cylinder from a low pressure inlet port and forced out of the cylinder to a high-pressure outlet port. In a hydraulic motor, fluid from a high-pressure inlet enters each cylinder in turn and vents to a low pressure outlet. Some machines, commonly referred to as pump/motors, are configured to operate as pumps or motors, according to how fluid is applied to the machine.

The operation of a typical bent-axis pump/motor will be described with reference to its operation as a motor. Operation of such devices in "pump" mode will not be described inasmuch as such operation will be clear to one having ordinary skill in the art, in view of the following description. For brevity, pump/motor machines may be referred to hereafter simply as motors.

In the accompanying figures, some of the features are shown as being members of a plurality of substantially identical features, in which case, each of the plurality is given the same reference number. In cases where a letter is also used, this is for ease of reference, for the purpose of indicating particular ones of the plurality in the descriptive text. Use of the reference number without specifying an accompanying letter may be understood to indicate the corresponding features generically.

The term "axial force" is used herein to refer to force vectors that lie substantially parallel to a defined axis, while the term "radial force" is used to refer to force vectors that lie in a plane that is substantially perpendicular to a defined axis. Neither term is limited to vectors that intersect the axis. In particular, the radial forces referred to herein generally lie in vectors some distance from the defined axis such that a device that is configured to rotate about the axis, and upon which the radial forces act, will tend to rotate in reaction to the forces.

FIGS. 1A-1C show sectional views of a portion of a bent-axis pump/motor 100 according to known art. The motor 100 includes a valve plate 102 and a cylindrical barrel 104, having a plurality of cylinders 106 within which pistons 108 travel reciprocally. The pistons 108 each have a sliding seal engagement with walls of the respective cylinder 106, at first ends of the pistons. Each of the pistons 108 engages a respective socket formed in a drive plate 110 at a second end thereof. The drive plate 110 is coupled to an output shaft 120 that is rotationally driven by the motor 100. The drive plate 110 bears against a thrust bearing 118 configured to permit free rotation of the drive plate 110 and shaft 120, while holding the drive plate in position against radial and axial forces acting thereon. Typically, bent-axis pump/motors are provided with an odd number of cylinders and pistons, usually seven or nine. In FIGS. 1A-1C cylinder 106A and piston 108A are shown positioned at the top of the barrel 104 while cylinder 106B and piston 108B are shown at the bottom of the barrel 104. In the case of an actual machine employing an odd number of cylinders, a cross-section through a center of the barrel would not intersect two cylinders at the same time, but that condition is shown here for the purpose of illustrating the relative volumes of fluid constrained by the pistons 108 at the top and bottom of rotation.

The cylinder barrel 104 is configured to rotate around a first axis A with a face 114 of the cylinder barrel 104 slideably coupled to a face of the valve plate 102, which does not rotate. The drive plate 110 rotates around an axis B, and is coupled to the rotating cylinder barrel 104 by a constant velocity joint 116 (only portions of which are shown in FIGS. 1A-1C). Accordingly, the cylinder barrel 104 and the drive plate 110 rotate at a common rate.

As the cylinder barrel 104 rotates, each of the cylinders 106 follows a circular path. The uppermost point of that path is referred to as top-dead-center, indicated in FIGS. 1A-1C as TDC, while the lowermost point in the rotation is referred to as bottom-dead-center, indicated in FIGS. 1A-1C as BDC.

The valve plate 102, barrel 104, and pistons 108, which define axis A, are configured to rotate with respect to the drive plate 110, which defines axis B, for the purpose of varying the displacement volume of the pump/motor 100, as explained below. The degree of rotation of axis A away from a coaxial relationship with axis B is typically referred to as the stroke-angle of the device.

FIG. 1A shows the motor 100 at a maximum stroke angle, which provides a maximum displacement of the motor for a high degree of energy transfer. FIG. 1B shows the motor 100 positioned at a moderate stroke angle, and FIG. 1C shows the motor 100 at a stroke angle of zero, wherein the axes A and B are coaxial, and wherein energy transfer is virtually zero.

The term displacement is used to refer to the volume in the cylinders 106 that is swept by the pistons 108 during a single rotation of the barrel 104, and may be used with a numerical value and a unit indicating a volumetric measure, such as $cm^3$, etc., when referring to a particular machine. In the present case, the devices pictured in the accompanying figures are provided for the purpose of illustrating principles that are important to an understanding of the invention, and are not intended to depict specific devices. Accordingly, volumetric values of displacement will not be provided.

In each of the FIGS. 1A-1C, the piston 108A positioned in cylinder 106A at TDC, lies at the inner limit (IL) to which it will travel over the course of a rotation of the barrel 104, given the stroke angle shown. The position of the face of the piston 108A is indicated at line IL. By the same token, the piston 108B positioned in cylinder 106B at BDC, lies at the outer limit (OL) to which it will travel over the course of a rotation of the barrel 104. The position of the face of the piston 108B is indicated at line OL. In any given cylinder 106, the volume that lies between the lines OL and IL represents the displacement of that cylinder 106. Thus, the displacement of the pump/motor 100 is the sum of the displacements of all of the cylinders 106 of the device at that stroke angle.

When the stroke angle is at a 100% displacement, as shown in FIG. 1A, the lines OL and IL lie a maximum distance apart. This is the maximum displacement that can be achieved by the pump/motor 100, and provides the highest degree of energy transfer from the high-pressure fluid to the rotation of the drive plate 110, in the form of torque. FIG. 1B shows a moderate stroke angle of approximately 50% displacement. It may be seen that the lines OL and IL lie closer together than in FIG. 1A. At this lower angle, a lower degree of force transfer is achieved. When the pump/motor is at a minimum stroke angle, as shown in FIG. 1C, the lines OL and IL define the same point since, as the barrel 104 rotates while at this stroke angle, the pistons 108 do not move axially within the respective cylinders 106, and so do not sweep any volume. At the stroke angle shown in FIG. 1C, the drive motor 100 is at minimum, or 0%, displacement, and receives no motive force from the high-pressure fluid, but is free to coast under its own inertia or by external forces. When a motor is destroked to 0%, the high-pressure fluid supply may be closed so that the pistons are not subject to the high pressure. This eliminates axial loading by the pressurized pistons, as will be described in more detail hereafter.

When the pump/motor 100 is operating in a motor mode, high-pressure fluid is valved into each cylinder 106 as it passes TDC. The high-pressure fluid applies a driving force on the face of the piston 108 that acts on the piston 108 axially with respect to axis A. This force is transferred by the piston 108 to the drive plate 110.

Referring to FIG. 1A, it may be seen that the driving force on the pistons 108 is axial, relative to axis A, but will include both axial and radial force components, relative to axis B. The distribution of the driving force between the axial and radial components will depend on the stroke angle of the pump/motor, and can be calculated in accordance with well known and long established mechanical principles. The axial component will tend to drive the drive plate away from the barrel along axis B, which is prevented by the thrust bearing 118. The radial component will tend to drive the socket of the drive plate 110, into which the second end of the piston 108 is seated, to move downward, causing the drive plate 110 to rotate so that the socket moves further away from the barrel, with the barrel 104 rotating in unison.

It will be recognized that the lower the stroke angle, the more of the driving force will be distributed to the drive plate as an axial force, until, at a zero stroke angle such as that shown in FIG. 1C, all of the drive force is distributed to the drive plate as an axial force. It will also be recognized that, while the radial force component serves to drive the rotation of the drive plate to provide torque to the motor, the axial force against the drive plate is not converted to a useful form of energy, and tends to exert high loads to the drive plate 110, the bearing 118, and the valve plate 102, and create frictional resistance to rotation of the motor 100. As a consequence, the efficiency of the motor 100 in converting fluid pressure to a useful form of energy decreases as the stroke angle decreases, and increases as the stroke angle increases.

A more detailed discussion regarding the operation and structure of hydraulic pump/motors may be found in U.S. patent application Ser. No. 10/379,992, entitled HIGH-EFFICIENCY, LARGE ANGLE, VARIABLE DISPLACEMENT HYDRAULIC PUMP/MOTOR; and Ser. No. 10/795,797, entitled EFFICIENT PUMP/MOTOR WITH REDUCED ENERGY LOSS, which applications are incorporated herein by reference, in their entirety.

BRIEF SUMMARY OF THE INVENTION

According to an embodiment of the invention, a hydraulic machine is provided, comprising a first variable displacement hydraulic motor having a first displacement capacity and a first output to which the first motor is configured to apply a varying degree of torque according to a degree of displacement of the first motor, and a second variable displacement hydraulic motor having a second displacement capacity, and a second output to which the second motor is configured to apply a varying degree of torque according to a degree of displacement of the second motor. The outputs of the first and second motors are rigidly coupled to opposite ends of an output shaft such that the first and second motor outputs rotate at a common rate with the output shaft. A displacement control unit is configured to control displacement of the first and second motors such that while the sum of the displacements of the first and second motors is below a first value, the displacement of the first motor is substantially equal to the sum, and the displacement of the second motor is substantially equal to zero.

According to an embodiment, the control unit is further configured to control displacement of the first and second motors such that while the sum of the displacements of the first and second motors is above the first value, the displacement of the first motor is substantially equal to the displacement of the second motor.

According to an embodiment, the first and second motors are of substantially equal size. According to another embodiment, the first motor is substantially smaller than the second motor.

According to an embodiment of the invention, a method of operation is provided, in which output torque of opposing motors of a drive machine are independently controlled.

BRIEF DESCRIPTION OF THE SEVERAL VIEWS OF THE DRAWINGS

In the drawings, identical reference numbers identify similar elements or acts. The particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. Additionally, well known structures associated with hydraulic motors, hybrid vehicle systems, and the like have not been shown or described in detail to avoid unnecessarily obscuring descriptions of the embodiments of the invention.

Figure 2:
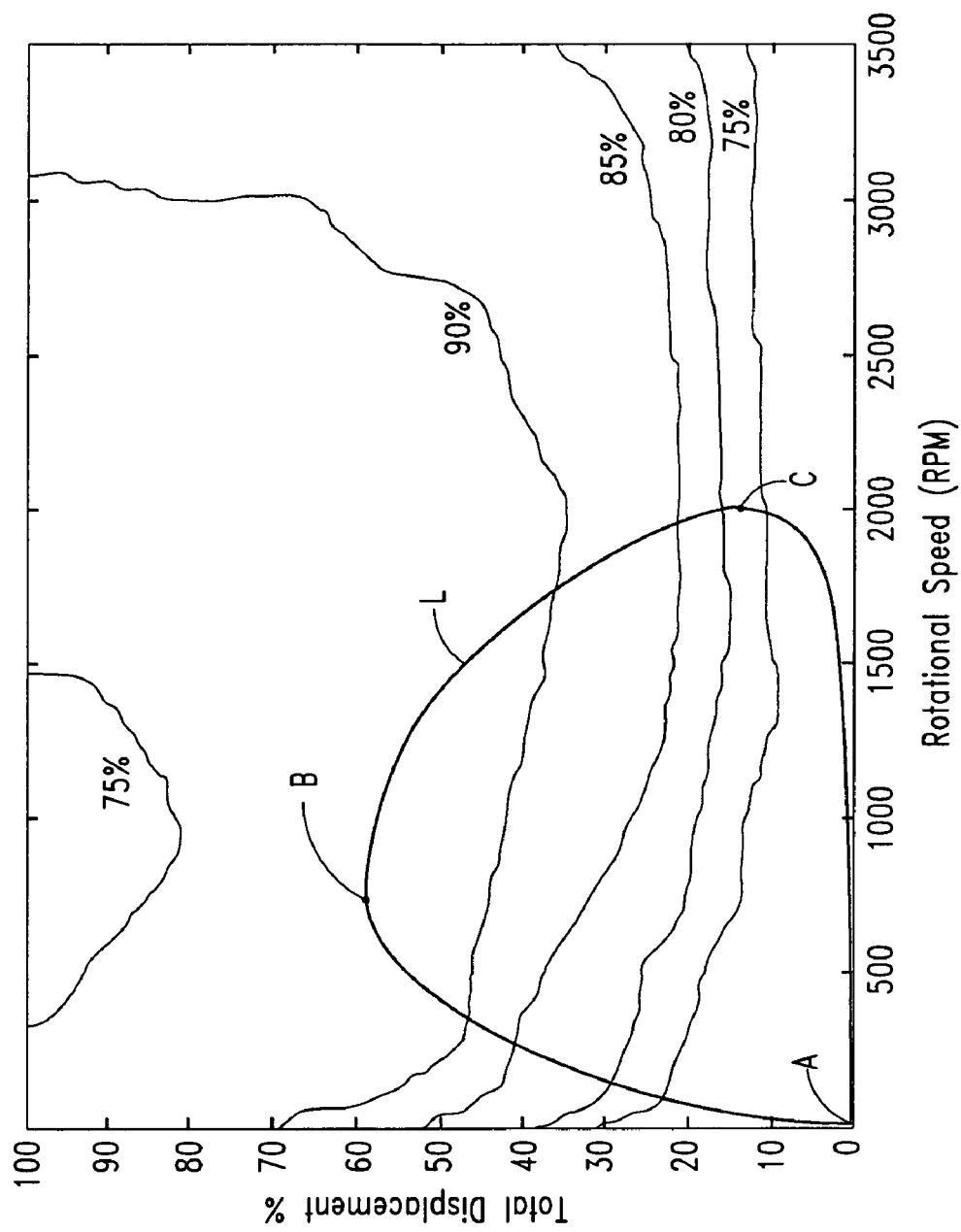
FIG. 2 is an efficiency map of a hydraulic motor.

Referring now to FIG. 2, an efficiency map of a hydraulic motor is shown. The vertical scale indicates the displacement of the hydraulic motor, which correlates to the stroke angle and torque output of the motor, while the horizontal scale indicates the rate of rotation (RPM) of the motor. The contour lines indicate levels of efficiency in converting fluid pressure to usable energy, and range between 75% and 95%, with lower values not indicated on the map. In a machine employed to drive a hybrid vehicle, these values would correlate, at least to a degree, to overall fuel efficiency of the vehicle.

In typical hybrid vehicle operation, the stroke angle is directly related to the position of the accelerator pedal, while the motor RPMs correspond to the speed of the vehicle. For the purpose of this discussion, it will be assumed that the motor is coupled to the drive-wheels of the car without an intervening changeable transmission, though the principles of operation apply to vehicles with transmissions, as well.

The map of FIG. 2 was derived from data collected in the laboratory using a test motor, and is provided for exemplary purposes only. Efficiency maps of different motors will vary in response to a number of parameters, including fluid pressure and the design features and manufacturing tolerances of the particular motor, for example.

For the purposes of this discussion, it will be assumed that all motors discussed herein share the efficiency characteristics mapped in FIG. 2. Line L represents a displacement/RPM curve of a vehicle motor, that might result from an acceleration from a stopped condition to a steady moderate cruise speed, and then back to a stop. Beginning at point A, a driver of the vehicle depresses the accelerator, causing the motor to stroke to around 60% displacement as the line passes point B. The vehicle accelerates, and as the speed of the vehicle rises, the driver begins to ease off on the accelerator, though the vehicle continues to accelerate as the displacement drops. When the vehicle arrives at the target speed, at around 2,000 RPMs, the driver holds the accelerator at about 15% displacement to maintain that speed, as shown at point C. To stop, the driver releases the accelerator, allowing the vehicle to slow back to the stopped condition at point A.

It is important to recognize that the map of FIG. 2 does not provide a time reference. If it is assumed that the vehicle travels several miles at the steady state of point C, the time occupied by the transition of the motor from point A to point C and from point C to point A is only a small fraction of the time during which the motor operates at point C. Thus, the overall operating efficiency of the motor is substantially equal to the efficiency achieved at point C, and lies between 75% and 80%.

Figure 3:
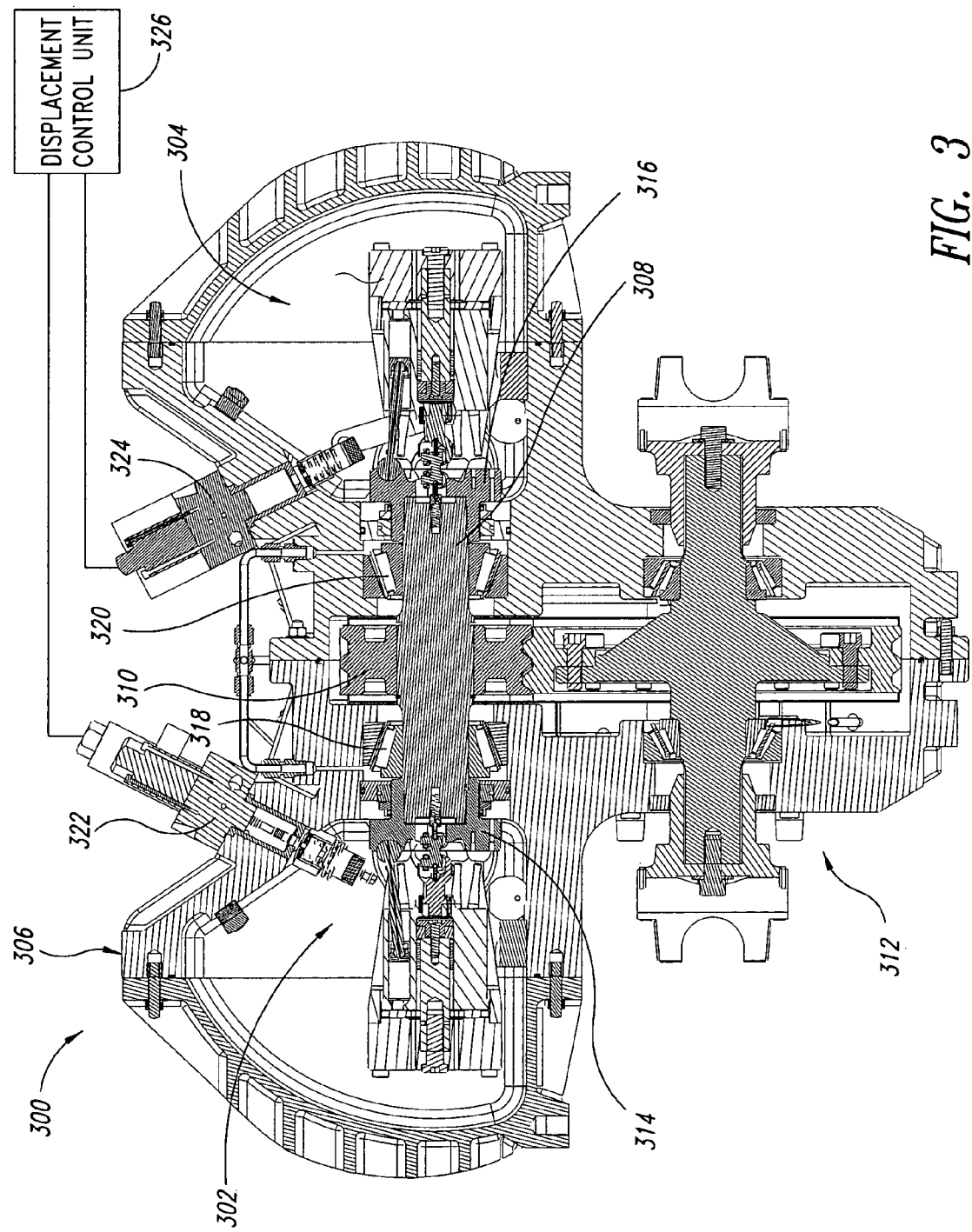
FIG. 3 shows a sectional view of a hydraulic machine having first and second opposed motors.

FIG. 3 illustrates a drive machine 300 configured in accordance with principles disclosed in U.S. patent application Ser. No. 10/620,726, filed by the inventor and incorporated herein by reference, in its entirety. The machine 300 comprises first and second opposing pump/motors 302, 304, each configured to operate substantially as described with reference to the pump/motor 100 of FIGS. 1A-1C. The first and second opposing motors 302, 304 are positioned within a common casing 306 and share a common output shaft 308. Actuation pistons 322, 324 control displacement of the respective motors 302, 304. The pistons 322, 324, in turn, are controlled by a displacement control unit 326, shown here diagrammatically. Drive plates 314, 316 are rigidly coupled to the shaft 308 such that axial loads of the respective motors are transmitted from the drive plates 314, 316 to the shaft 308. Bearings 318, 320 support the shaft 308. A drive gear 310 transmits torque from the output shaft 308 to other components of a power transmission system such as a vehicle drive train, indicated generally in FIG. 3 as 312. Details of such additional components are not essential for an understanding of the invention, and so will not be provided here.

Methods for control of motor displacement are known in the art. The control unit 326 may comprise any of a computer module, a dedicated processing unit, a portion of a more general processor, a memory, a lookup table, a mechanical linkage, hydraulic valves and lines, etc.

Figure 1A:
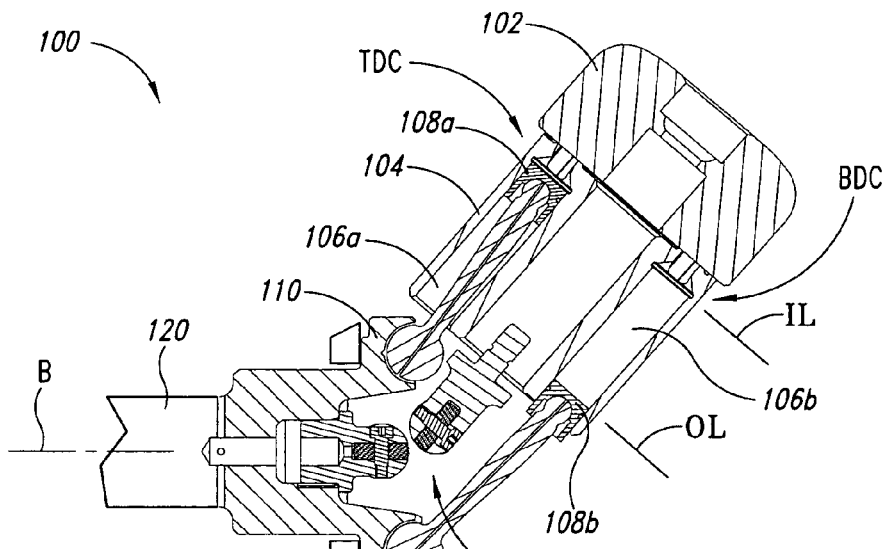
FIG. 1A shows in cross-section components of a hydraulic pump/motor according to known art, at a maximum stroke angle.
Figure 1B:
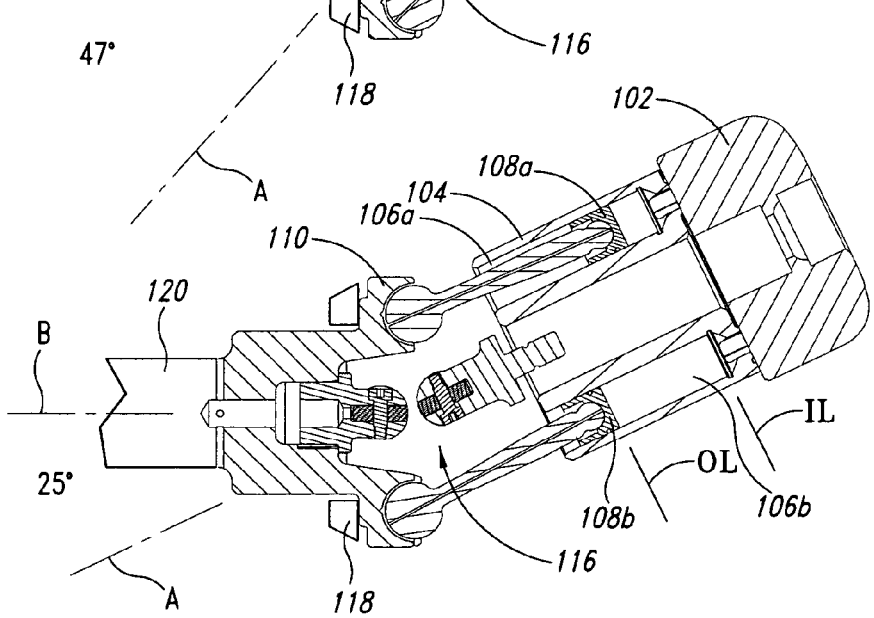
FIGS. 1B and 1C show sectional views of the pump/motor of FIG. 1A at moderate and zero stroke angles, respectively.
Figure 1C:
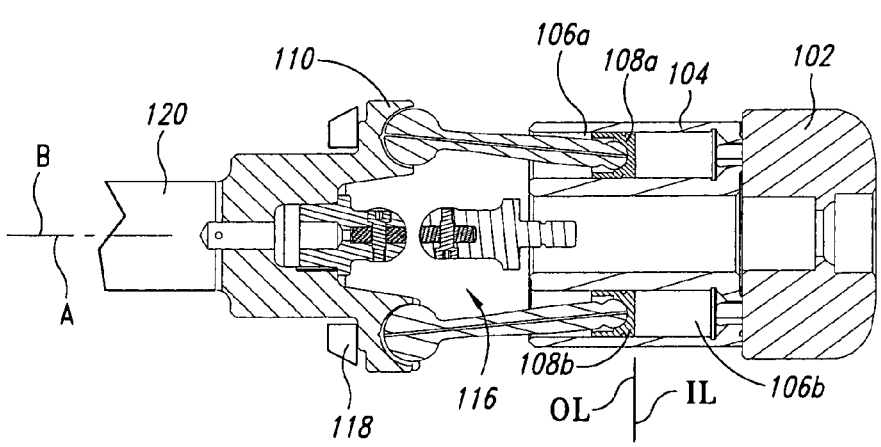

The motors 302, 304 are configured to operate in tandem. Namely, they are coupled together such that the stroke angle of each motor 302, 304 is substantially equal to that of the other. Axial forces generated within each motor 302, 304 are also substantially of equal value but of opposite polarity, and thus largely cancel each other, resulting in a nominal net axial load of zero. This means that highly robust axial thrust bearings like those required with typical hydraulic motors such as the motor 100 of FIGS. 1A-1C, are not necessary. The thrust bearings 318, 320 need tolerate only such minimal axial thrust as results from normal fluctuations in the motors 302, 304 and from loads induced by the gear 310. This results in savings in weight, mass, and expense. Other advantages are provided by reducing the size of pressure-bearing structures such as casings, valve plates, barrels, pistons, etc.

For a total given displacement, two synchronized pump/motors in opposition have a higher overall efficiency than a single pump/motor having an equivalent displacement. Nevertheless, it is assumed that opposing pump/motors 302, 304 together operate according to the efficiency map of FIG. 2. That is to say that if a user demands 15% displacement of a drive system to operate at the RPMs indicated at point C of line L, the efficiency of the system will be under 80%, whether the drive system is powered by a single motor of a given displacement or by opposing motors having a total displacement (TD) equal to that of the single motor and operating as described with reference to FIG. 3.

As is well known, drive motors or engines powering passenger vehicles are rarely required to deliver their maximum power output. Generally, average power demands on such machines lie between about 10% and 30% of a drive machine's total capability, and only intermittently rises above 60-70%. As such, a hybrid vehicle with hydraulic drive motors having characteristics like those mapped in FIG. 2 will operate mostly below 75-80% efficiency.

Figure 4:
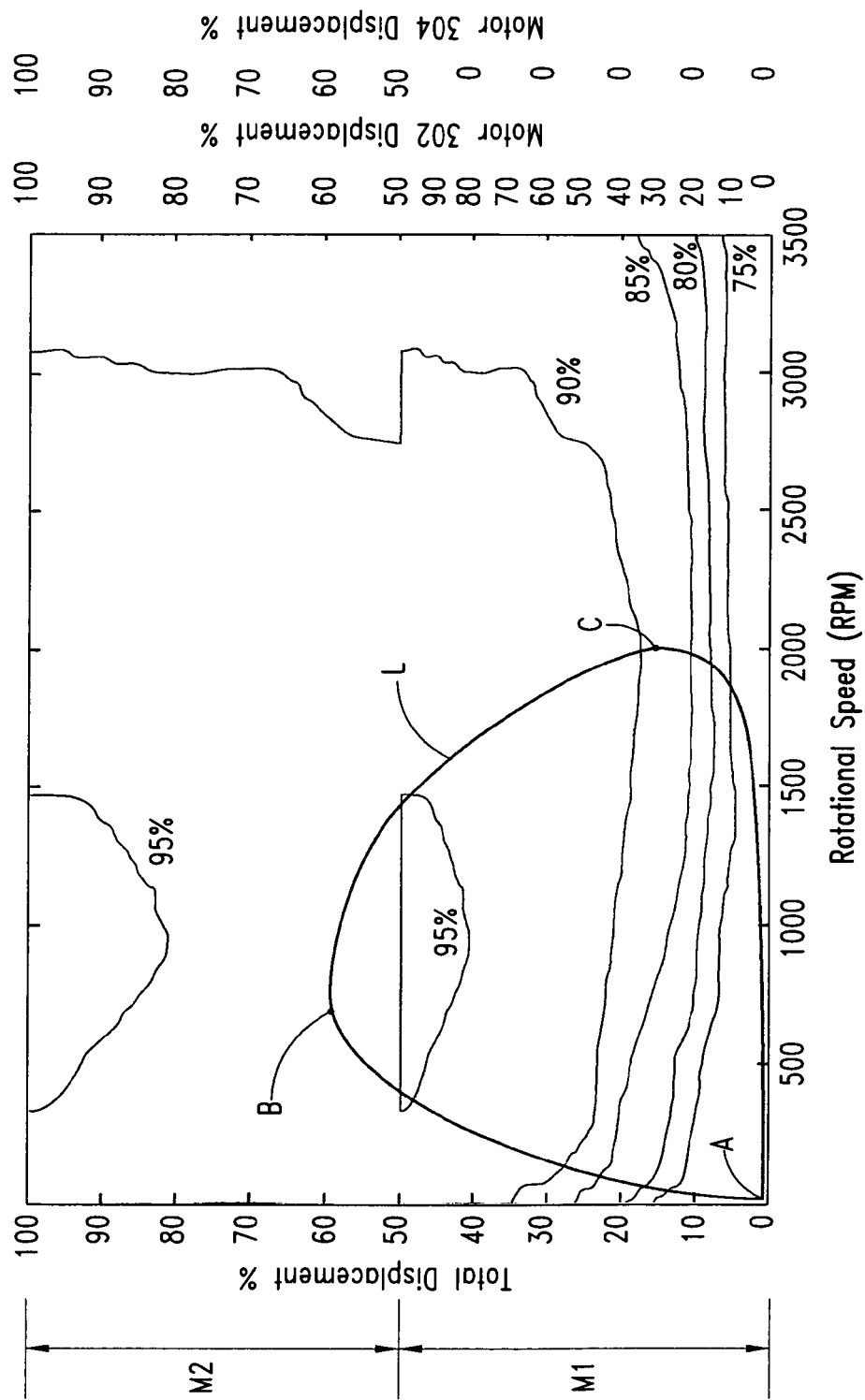
FIG. 4 is an efficiency map related to the machine of FIG. 3 as controlled according to an embodiment of the invention.

Referring now to FIG. 4, a method of operation is described in accordance with an embodiment of the invention. Bearing in mind that each of the motors 302, 304 of FIG. 3 has the same maximum displacement, it will be recognized that when they are both at an equal stroke angle, each will comprise half of the total displacement of the drive machine 300. Thus, if they are each at 50%, for example, the displacement of motor 302 alone represents 25% of the total displacement of the machine 300. According to an embodiment of the invention, the first and second motors 302, 304 are stroked at different displacements according to the required overall displacement.

The operation of machine 300 falls into two distinct modes of operation, M1, and M2. Operation mode M1 includes operation of the machine 300 under 50% TD. In this range of operation, motor 304 remains at 0% displacement while motor 302 operates between 0% and 100% displacement to provide the 0-50% displacement of mode M1.

Thus, when an output torque corresponding to 25% TD is demanded of the machine 300, the first motor 302 is stroked to 50%, while the second motor 304 remains at 0%. Up to 50% TD, all drive power is supplied by the first motor 302. When the demand crosses 50% TD, the first motor is destroked to 50% while the second motor is simultaneously stroked up to 50%, maintaining the total displacement of 50%. Beyond this point both motors 302, 304 operate in unison as described with reference to FIG. 3.

FIG. 4 shows an integrated efficiency map in which the improved efficiency obtained by operating the first motor 302 alone in the first operating mode is integrated with the efficiency map of both motors 302, 304 operating above 50% TD in mode 2. The line L is identically positioned in FIG. 4 to show the effects of the change in operation on the efficiency of the motor 300. At the right of the map, the displacement of each of the motors 302, 304 is shown, corresponding to a given total displacement shown on the left. In a case where the machine 300 is employed to operate a vehicle, the total displacement, shown at the left of the map of FIG. 4, corresponds generally to an accelerator pedal position.

By comparing FIG. 4 with FIG. 2, it can be seen that the efficiency of the machine 300 is significantly improved in the range below 50% displacement. Because a large proportion of the vehicle operation occurs in this range, the apparatus and method of operation described above can significantly improve the overall efficiency and fuel economy of the associated vehicle. Where FIG. 2 shows point C lying between 75% and 80% operating efficiency, FIG. 4 shows point C lying between 85% and 90% operating efficiency, an improvement of more than 10%.

While the transition between the first mode M1 and the second mode M2 has been placed at 50% TD in the description above, the selection of the transition point and other operational parameters is a matter of design choice, and may be influenced by various factors including the actual efficiency characteristics of a given motor, the expected operating conditions of the motor, etc.

Because the motors 302 and 304 do not operate in unison below 50% TD, the axial loads will not be equal, resulting in increased axial loading of the bearing 318. The effects and implications of the additional axial loading as compared to operation in tandem will be discussed later in this disclosure.

It will be recognized that the motor 302 will be in operation all of the time that the machine 300 is operating, while the motor 304 may operate for only 5-10% of the time. According to an embodiment of the invention, the displacement control unit is configured to periodically alternate operation, such that, during the alternate periods, the second motor 304 operates alone while the machine is in operating mode M1, and the first motor 302 is engaged when the system transitions to mode M2. In this way, wear is distributed evenly between the two motors.

According to another embodiment, the system is controlled such that, in the event either of the motors 302 or 304 malfunctions and is unable to function, the remaining motor is operated in mode M1 to provide "limp home" capability to the associated vehicle.

Figure 5:
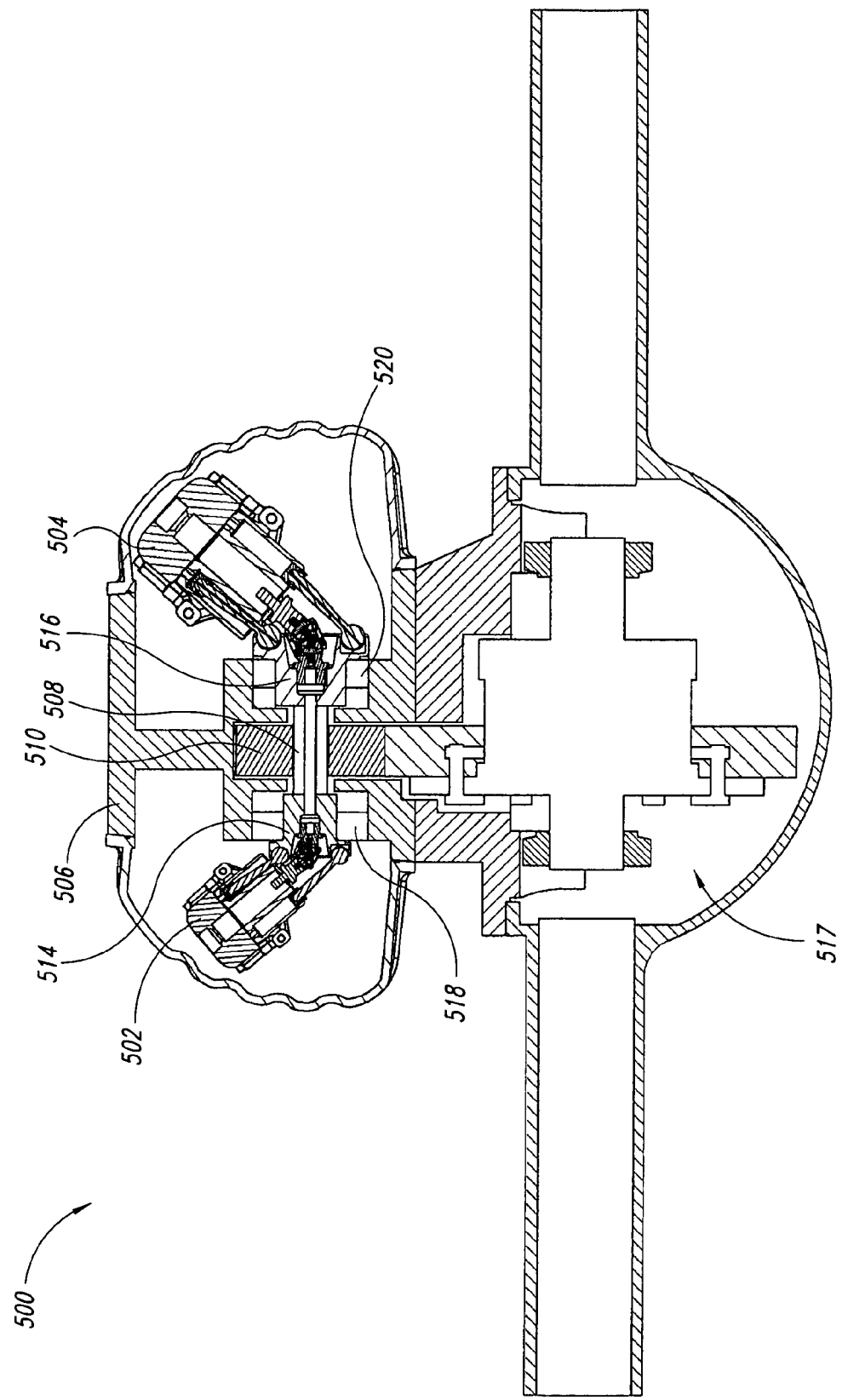
FIG. 5 is a cross-sectional view of a hydraulic machine in accordance with another embodiment of the invention.

FIG. 5 shows a drive machine 500 according to another embodiment of the invention. The machine 500 comprises first and second opposing pump/motors 502, 504, each configured to operate substantially as described with reference to the pump/motor 100 of FIGS. 1A-1C. The first and second opposing motors 502, 504 are positioned within a common casing 506 and share a common output shaft 508. Drive plates 514, 516 are rigidly coupled to the shaft 508 such that axial loads of the respective motors are transmitted from the drive plates 514, 516 to the shaft 508, in a manner similar to that described with reference to the machine 300 of FIG. 3. Bearings 518, 520 support the drive plates 514, 516, respectively, and are configured to receive axial and radial loads from the drive plates, as will be described in more detail hereafter. A drive gear 510 transmits torque from the output shaft 508 to other components of a power transmission system such as a vehicle drive train, indicated generally in FIG. 5 as 517.

While not shown in FIG. 5, the machine 500 also includes means for independently controlling the displacement of the motors 502, 504, as disclosed with reference to the machine 300 of FIG. 3.

It will be noted, with reference to FIG. 5, that drive components of the motor 502 are significantly smaller than those of motor 504. In the present example, the maximum displacement of the motor 502 is selected to be 60% that of motor 504, while the maximum total displacement of the drive machine 500 is selected to meet the maximum displacement requirements of the intended application. Accordingly, the displacement capacity of motor 502 will be equal to 37.5% of the total requirement while the displacement capacity of the motor 504 will be equal to 62.5% of the total requirement. In other respects, the configuration of the machine 500 may be similar to the configuration of the machine 300 of FIG. 3.

Figure 6:
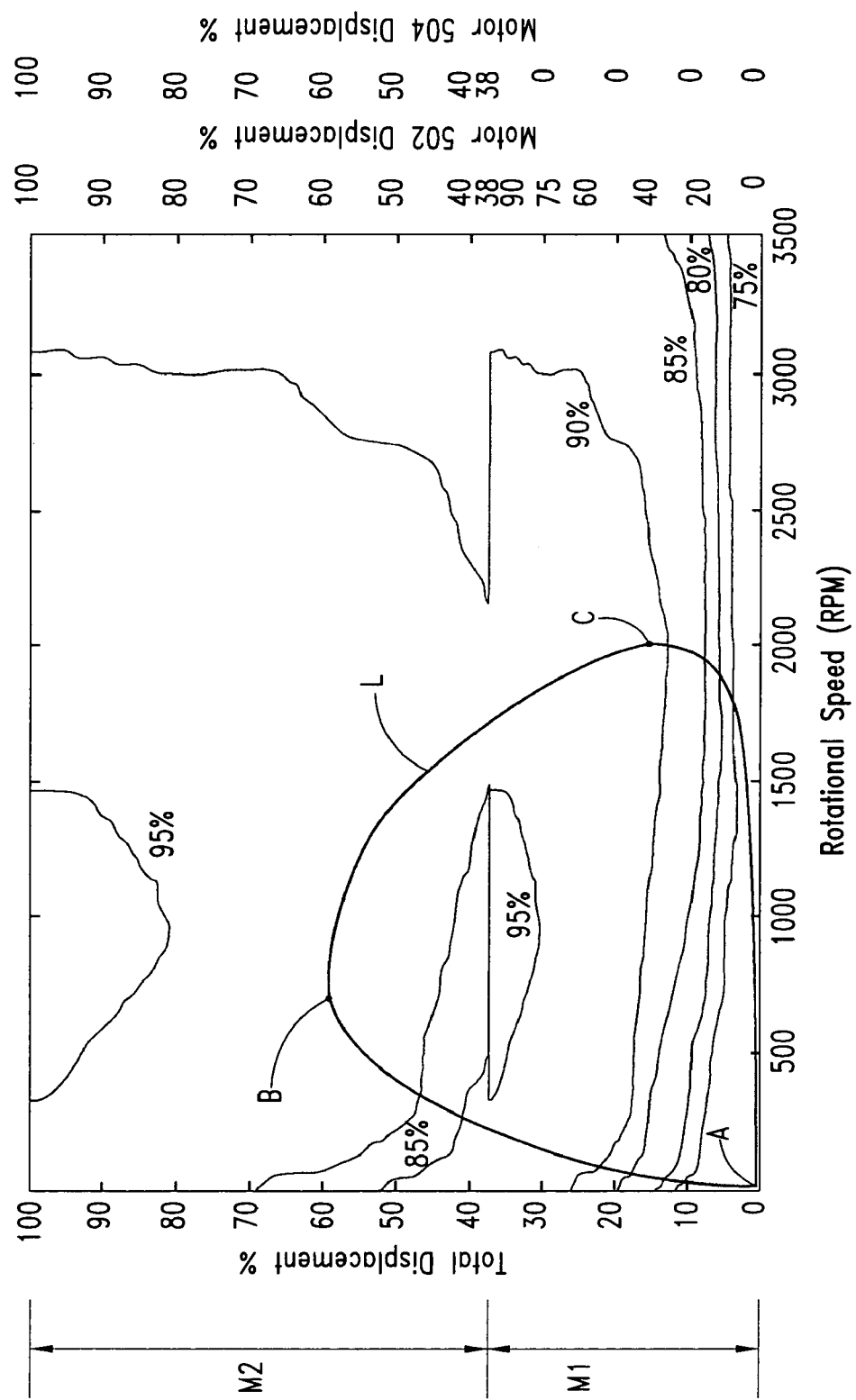
FIG. 6 is an efficiency map related to the machine of FIG. 5 as controlled according to a further embodiment of the invention.

The efficiency map of FIG. 6 corresponds generally to the map of FIG. 4, which is to say that FIG. 6 shows the integrated efficiency of the machine 500.

Like the embodiment of FIG. 4, the operation of the machine 500 falls into two modes of operation, M1 and M2. The range of mode M1 extends between 0% TD and 37.5% TD, while mode M2 extends between 37.5% TD and 100% TD. While the machine 500 is operating in mode M1, motor 504 is held at 0% displacement, while the smaller motor 502 provides all motive power to the output shaft 508. Because the motor 502 only comprises 37.5% of the total displacement capacity, a change of 1% of the total displacement requires a change of nearly 3% of the displacement of motor 502. As a result, the first motor 502 moves quickly into high efficiency operation.

The first motor 502 reaches 100% displacement at around 38% TD. As the total displacement rises past 38% (and into the range of mode M2), the first motor 502 is destroked to 38% while the second motor 504 is simultaneously stroked to 38%, which maintains the total displacement of 38%. This instantly brings the larger second motor 504 into a highly efficient range of operation—generally above 90%, in the present example. While the total displacement lies in the range of operating mode M2, both motors 502, 504 are stroked at the same rate, up to 100% TD.

Looking at the integrated efficiency map of FIG. 6, it may be seen that the cruise point C is now above 90%, an improvement of about 15% efficiency over the operation efficiency of a conventionally operated system.

The thresholds on the modes of operation described with reference to FIGS. 4 and 6 are selected for the purpose of illustrating the principles of operation. The actual transition range for a given system will be selected in accordance with requirements of that system. Additionally, the ratio of displacement volumes of the motors 502 and 504 may also be selected according to a particular application. For example in a case where it is anticipated that a machine will generally operate at a higher displacement, relative to RPM, the first motor 502 may be sized larger, relative to the second motor 504, than described herein, in order to be able to move the transition point to a higher total displacement.

According to an embodiment, motor 502 is stroked to zero displacement and motor 504 is stroked to 60% displacement at the transition from mode M1 to mode M2. For total displacements above the M1-M2 transition, the smaller first motor 502 is held at 0% displacement while the larger second motor 504 provides all motive power up to some higher displacement (for example 90% of the capacity of the second motor 504). When the total displacement rises above this level (i.e., about 56% TD), a transition into a third operating mode is effected, at which motor 504 is destroked to 56% displacement and motor 502 is stroked up to 56%, and both motors 504 and 502 stroke together for total displacements up to 100% TD.

It will be recognized that if the machine 500 is operated at a constant displacement very close to 37.5% displacement, the machine 500 may transition between modes M1 and M2 repeatedly, as load conditions vary slightly, requiring small adjustments in displacement. Such a condition might occur where the associated vehicle is ascending a hill or pulling a load, such that the cruise point C of line L is at the higher displacement. This may be distracting to occupants of the vehicle and may also create efficiency losses, as the second motor 504 is repeatedly stroked from zero to 38% and back.

Accordingly, another embodiment is provided in which, as total displacement rises past the selected threshold (37.5%, in the case of the machine 500) the machine transitions from mode M1 to mode M2 as described above. However, as the displacement TD drops, the transition back to mode M1 is not executed until the total displacement drops below a second threshold, 33%, for example. In this way, repeated transitions are avoided.

According to another embodiment, a transition from mode M2 to M1 is delayed for a selected time following a transition from M1 to M2. Thus, regardless of the displacement, the machine will operate in mode M2 for at least the selected time, after which a transition may be executed as described.

For the purpose of the discussion that follows, axial loads produced by the first motor 302 of FIG. 3, or the first motor 502 of FIG. 5, will be referred to as positive loads, while axial loads produced by the second motors 304 and 504 will be referred to as negative loads.

As was previously observed, in unbalanced systems such as those disclosed herein, axial loading is a factor in the operation of the machine. In calculating the requirements for a thrust bearing, several factors must be taken into consideration. These factors include the anticipated load, the rotational speed, and the expected service time or duty cycle of the bearing. If any of these factors can be reduced, the cost and reliability of the bearings can be improved. Typical hydraulic motors of the type discussed with reference to FIGS. 1A-1C are subjected to extremely high axial loading, especially at low stroke angles, and consequently require thrust bearings that are massive and expensive. In the case of balanced opposed motors, as discussed with reference to the machine of FIG. 3, the axial loads are largely canceled, which means that only minimal net axial loads are produced.

In the case of the method of operation described with reference to FIG. 4, the first motor 302 operates alone while the machine is in the range of mode M1, producing a positive net axial load on the shaft 308. However, several factors operate to reduce the requirements for the axial load bearing 318. First, because the motors 302, 304 are each half the maximum displacement of an equivalent single motor, the thrust bearings for each may be smaller. Second, the first motor 302 operates in a balanced mode with motor 304 any time the total displacement exceeds 50%. This effectively reduces the average duty cycle of the bearing 318, with respect to the axial force component. Finally, because displacement of the motor 302 increases at a 2:1 ratio with respect to the total displacement of the machine 300 while below 50% TD, the motor will spend less time at low stroke angles where high axial loads are transmitted, relative to known systems. This further reduces the effective duty cycle of the bearing 318.

Further, when the second motor 304 is operating, except for the moment when it is first energized as it is stroked to 50%, it always operates in a balanced mode with the first motor 302. Even at that initial moment, the first motor 302 is providing a positive axial load that will partially offset the greater low stroke angle load of the second motor 304. This means that, while axial load bearing is required for a positive load, there is only a minimal requirement for negative load bearing on the shaft 308, to accommodate the very low duty cycle of the negative axial load. The overall result is that the positive axial thrust bearing capabilities of bearing 318 can be much lower than those of conventional systems, while the negative thrust bearing 320 capabilities can be even further reduced, resulting in less massive and less expensive bearings.

Figure 7:
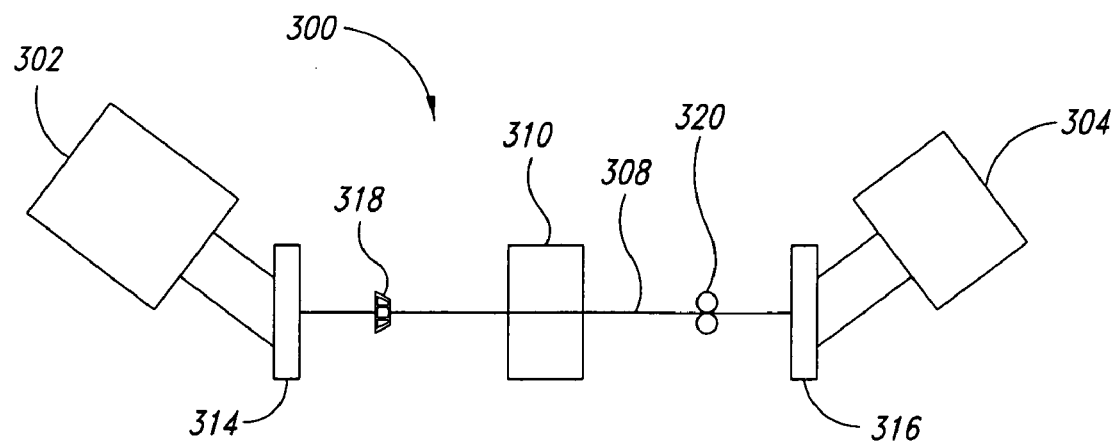
FIGS. 7 and 8 are diagrammatic representations of bearing arrangements of the machines of FIGS. 3 and 5, respectively.

This configuration is illustrated in the diagram of FIG. 7, which shows the machine 300 and some of its components. Bearing 318 is shown as a tapered roller bearing configured to receive a positive axial load from the drive plate 314. Meanwhile, bearing 320 is shown as a simple roller bearing configured to receive only minimal negative axial loads. According to another embodiment, the bearing 318 may be a double tapered bearing, configured to receive both positive and negative axial loads, such that bearing 320 supports only radial loads.

The method of operation of the drive machine 500 outlined above with reference to FIG. 6 has a similar load distribution, with respect to the polarities of the loads, but it will be recognized that the magnitudes of the loads will be different than those of the machine 300. For example, because motor 502 is much smaller, its maximum positive axial load, at very low displacement, will be much reduced. Additionally, motor 502 will spend even less time at low displacement than motor 302, given similar operating conditions, because of its higher stroke ratio relative to the total displacement. Also, it will have a somewhat lower duty cycle, since the transition point between modes is at around 38% TD, where the transition of motor 300 is around 50% TD. This means that the motor 500 will spend more time than motor 300 in mode 2.

In contrast to the system of machine 300, the first and second motors 502, 504 of machine 500 do not exert a balanced axial load when they are operating in the second mode M2. The larger motor 504 will exert a greater axial load than the first machine 502, resulting in a net negative axial load while in mode M2. Nevertheless, since both machines are above 38% displacement while in operating mode M2, and the positive load of motor 302 cancels more than half the negative load of motor 304, the axial load bearing requirements of the bearings 518, 520 will be reduced, as compared to conventional systems.

The point at which the first motor is energized, but the total displacement is still at about zero, is the point of maximum positive axial load. 38% TD is the point of maximum negative axial load, since the axial load of both motors will diminish as the total displacement increases beyond this point, across the range of mode M2. The average axial load on the shaft will be well below either maximum value.

Figure 8:
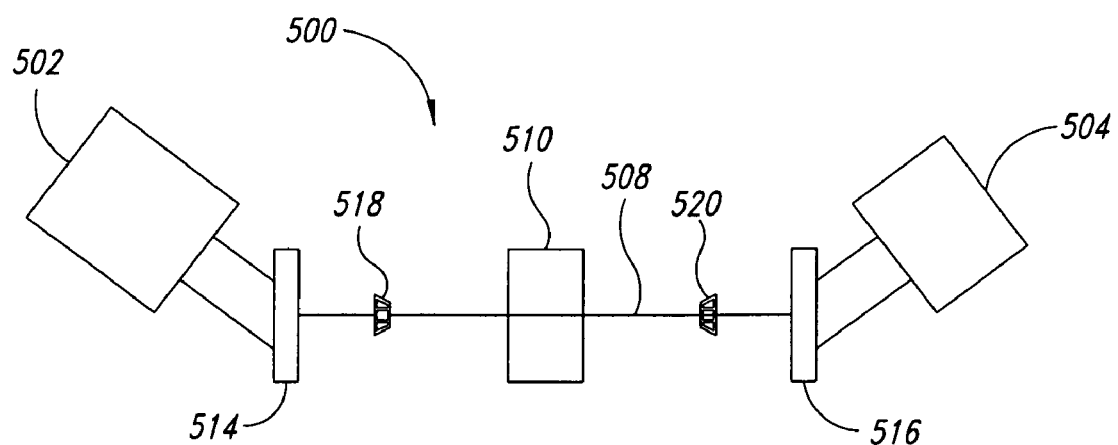

Referring to FIG. 8, one acceptable configuration, with respect to the bearings of the machine 500, is illustrated. Tapered roller bearings 518, 520 are provided to receive the positive and negative loads, respectively, of the motors 502 and 504. According to another embodiment, a double tapered bearing, configured to receive either positive or negative loads, is provided at one end of the shaft 508, while a simple and inexpensive cylindrical roller bearing is provided at the other.

Other configurations are also within the scope of the invention. For example, additional bearings may be provided on the output shaft or drive plates of either machine 300, 500, and the positive or negative axial loads may be divided among a plurality of thrust bearings positioned on the output shaft or at the drive plates. Tapered and cylindrical roller bearings have been described for the purpose of illustrating various embodiments of the invention. However, it will be recognized that various other types of bearings may also be employed, such as are known in the art.

One having ordinary skill in the art will recognize many variations of the disclosed embodiments. It will be recognized that there are trade-offs among factors such as machine efficiency, relative wear of the motors, axial loads, compressibility losses, leakage losses, simplicity of operation, driver comfort, etc. Consideration of such factors will affect the design of a working system embodying principles of the invention. Configuration of bearings, placement and distribution of operation ranges, pressurization of non-active motors, sizes of the motors relative to each other, and total displacement are among the parameters that may be adjusted in consideration of factors such as those listed above. Furthermore, additional modes of operation may be employed, such as, for example, a mode in which one motor remains at a fixed displacement, above zero, while the other varies to accommodate a demanded total displacement. In other modes, the motors may vary displacement at different rates, or in different directions.

Finally, features described with reference to one embodiment may be combined with features of another disclosed embodiment or with other previously known technologies. All of these variations are considered to fall within the scope of the invention.

The invention has been primarily described with reference to bent-axis hydraulic motors. Many of the principles of the invention provide similar advantages while operating hydraulic machines as pumps. Given the present disclosure, such applications and advantages will be clear to one having ordinary skill in the art. Additionally, exercise of the principles of the invention is not limited to operation with bent-axis pump/motors such as are described herein, but may also be employed with other variable displacement hydraulic machines, in accordance with the general concepts disclosed. These include, for example, swash plate, sliding back plate, and radial piston machines, among others. Finally, the inventor has recognized that many of the advantages outlined herein may also be realized in the operation of a system employing electric motors in accordance with the principles described. In view of the above, the use of the term "motor," as used in the specification and claims, is considered to include hydraulic motors, hydraulic pumps, and hydraulic pump/motors, as well as electric motors and generators.

Where used in the claims, the term "displacement percentage" refers to the displacement volume of the recited motor, as a percentage of its displacement capacity, or maximum displacement. Thus, if, for example, a claim recites first and second motors having equal displacement percentages, such a claim would read on a first motor having a 200 cm$^3$ capacity and stroked to 50%, and a second motor having a 120 cm$^3$ capacity, also stroked to 50%. Similarly, the term "output torque percentage" refers to the output torque of the recited motor, as a percentage of its output torque capacity.

The abstract of the present disclosure is provided as a brief outline of some of the principles of the invention, and is not intended as a complete or definitive description of any embodiment thereof, nor should it be relied upon to define terms used in the specification or claims. The abstract does not limit the scope of the claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A hydraulic machine comprising:
a first variable displacement hydraulic motor having a first displacement capacity and a first output to which the first motor is configured to apply a varying degree of torque according to a degree of displacement of the first motor;
a second variable displacement hydraulic motor having a second displacement capacity, and a second output to which the second motor is configured to apply a varying degree of torque according to a degree of displacement of the second motor;
an output shaft to which the outputs of the first and second motors are rigidly coupled at respective ends thereof such that the first and second outputs rotate at a common rate; and
a displacement control unit configured to control displacement of the first and second motors such that:
while the sum of the displacements of the first and second motors is below a first value, the machine operates in a first mode, in which the displacement of the first motor is substantially equal to the sum, and the displacement of the second motor is substantially equal to zero,
if the sum of the displacements increases from below the first value to beyond the first value, without exceeding a second value, greater than the first value, the machine continues to operate in the first mode, if the sum of the displacements increases to beyond the second value, the machine operates in a second mode, and once having increased beyond the second value, the machine does not return to operation in the first mode until the sum of the displacements drops below the first value.

2. The machine of claim 1 wherein the control unit is further configured to control displacement of the first and second motors such that while the sum of the displacements of the first and second motors is above the first value, a displacement percentage of the first motor is substantially equal to a displacement percentage of the second motor.

3. The machine of claim 1 wherein the first value is equal to about 50% of a sum of the displacement capacities of the first and second motors.

4. The machine of claim 1 wherein the first value is equal to about 38% of a sum of the displacement capacities of the first and second motors.

5. The machine of claim 1 wherein the first value falls in a range between about 20% and 60% of a sum of the displacement capacities of the first and second motors.

6. The machine of claim 1 wherein the control unit is further configured to control displacement of the first and second motors such that if the sum of the displacements increases to beyond a second value, greater than the first value, a displacement percentage of the first motor is substantially equal to a displacement percentage of the second motor while the sum of the displacements of the first and second motors remains above the first value, and if the sum of the displacements decreases to below the first value, the displacement of the first motor is substantially equal to the sum, and the displacement of the second motor is substantially equal to zero while the sum of the displacements remains below the second value.

7. The machine of claim 1 wherein the control unit is further configured to control displacement of the first and second motors such that if the sum of the displacements increases to beyond the first value, a displacement percentage of the first motor is substantially equal to a displacement percentage of the second motor for at least a selected time period, regardless of subsequent changes of the sum of the displacements.

8. The machine of claim 1 wherein the first displacement capacity is substantially equal to the second displacement capacity.

9. The machine of claim 1 wherein the first displacement capacity is less than the second displacement capacity.

10. The machine of claim 1 wherein the first displacement capacity is approximately equal to half the second displacement capacity.

11. The machine of claim 1, further comprising a drive gear positioned on the output shaft.

12. The machine of claim 1, further comprising bearing means for receiving unequal axial loads on the output shaft from the first motor and second motors.

13. The machine of claim 1 wherein the control unit is further configured to control displacement of the first and second motors such that while the sum of the displacements is greater than the first value and less than a second value, the displacement of the second motor is substantially equal to the sum, and the displacement of the first motor is substantially equal to zero.

14. The machine of claim 9 wherein the first displacement capacity is equal to approximately 60% of the second displacement capacity.

15. The machine of claim 13 wherein the control unit is further configured to control displacement of the first and second motors such that while the sum of the displacements is greater than the second value a displacement percentage of the first motor is substantially equal to a displacement percentage of the second motor.

16. A hybrid vehicle system comprising:
a drive machine having first and second opposing and rotationally coupled motors; and
a control unit configured to independently control output torque of the first and second motors according to an operating range in which a total output torque of the machine falls, such that the first and second motors transition from a first mode of operation to a second mode of operation as the total output torque of the machine rises past a first threshold, and transition from the second mode of operation to the first mode of operation as the total output torque of the machine drops below a second threshold that is lower than the first threshold.

17. The system of claim 16 wherein the control unit is configured to control the output torque of the first motor to be substantially equal to the total output torque of the machine and the output torque of the second motor to be substantially equal to zero while in the first mode of operation.

18. The system of claim 16, further comprising a vehicle drive train coupled to an output shaft of the drive machine.

19. The system of claim 16 wherein the first motor has an output torque capacity that is less than an output torque capacity of the second motor.

20. The system of claim 16 wherein the first motor has an output torque capacity of approximately 60% an output torque capacity of the second motor.

21. The system of claim 16 wherein the first motor has an output torque capacity approximately equal to an output torque capacity of the second motor.

22. The system of claim 16 wherein the first and second motors are hydraulic motors.

23. The system of claim 16 wherein the first and second motors are electric motors.

24. The system of claim 16 wherein output shafts of the first and second opposing and rotationally coupled motors are rotationally locked so as to rotate at a same rate.

25. The system of claim 17 wherein the control unit is configured to control the output torque of the first motor to be substantially equal to the output torque of the second motor while in the second mode of operation.

26. The system of claim 17 wherein the control unit is configured to control an output torque percentage of the first motor to be substantially equal to an output torque percentage of the second motor while in the second mode of operation.

27. A method comprising:
varying an output torque of a first motor of a machine and maintaining a second motor of the machine, rotationally coupled to the first motor, at an output torque substantially equal to zero while a total output torque of the machine is within a first range;
varying the output torque of the first motor of the machine and maintaining the second motor of the machine at an output torque substantially equal to zero while the total output torque of the machine is within a second range, greater than the first range, if the total output torque of the machine increases from the first range to the second range;

varying the output torque of the second motor while the total output torque of the machine is within a third range, greater than the second range; and varying the output torque of the second motor while the total output torque of the machine is within the second range if the total output torque of the machine decreases from the third range to the second range.

28. The method of claim 27 wherein varying the output torque of the second motor comprises varying the output torques of the first and second motors substantially equally.

29. The method of claim 27, further comprising bringing the output torques of the first and second motors to substantially equal values when the total output torque of the machine increases to beyond a first selected threshold, and bringing the second motor to an output torque substantially equal to zero while varying the output torque of the first motor when the total output torque decreases to below a second threshold, lower than the first threshold.

30. The system of claim 27 wherein output shafts of the first and second motors are rotationally locked so as to rotate at a same rate.

31. The method of claim 27, wherein varying the output torque of the second motor comprises varying the output torque of the second motor while maintaining the first motor at an output torque substantially equal to zero, the method further comprising varying the output torques of the first and second motors substantially equally while the total output torque of the machine is within a fourth range, greater than the third range.

32. The method of claim 27 wherein the total output torque of the machine is equal to a sum of the output torque of the first motor and the output torque of the second motor.

33. The method of claim 28 wherein the varying the output torques of the first and second motors substantially equally comprises varying output torque percentages of the first and second motors substantially equally.

34. The method of claim 33 wherein an output torque capacity of the first motor is less than an output torque capacity of the second motor.

35. A hydraulic machine comprising:

a first variable displacement hydraulic motor having a first displacement capacity and a first output to which the first motor is configured to apply a varying degree of torque according to a degree of displacement of the first motor;

a second variable displacement hydraulic motor having a second displacement capacity, and a second output to which the second motor is configured to apply a varying degree of torque according to a degree of displacement of the second motor;

an output shaft to which the outputs of the first and second motors are rigidly coupled at respective ends thereof such that the first and second outputs rotate at a common rate; and a displacement control unit configured to control displacement of the first and second motors such that while the sum of the displacements of the first and second motors is below a threshold value, the displacement of the first motor is substantially equal to the sum, and the displacement of the second motor is substantially equal to zero, and while the sum of the displacements of the first and second motors is above the threshold value, a displacement percentage of the first motor is substantially equal to a displacement percentage of the second motor.

36. A hybrid vehicle system comprising:

a drive machine having a first motor and a second motor, outputs of the first and second motors being rotationally coupled; and a control unit configured to independently control output torque of the first and second motors according to an operating range in which a total output torque of the machine falls, such that the output torque of the first motor is substantially equal to the total output torque of the machine and the output torque of the second motor is substantially equal to zero while the total output torque lies in a first range of operation, and the output torque percentage of the first motor is substantially equal to an output torque percentage of the second motor while the total output torque lies in a second range of operation.

37. The hybrid vehicle system of claim 36 wherein the control unit is configured to control output torque of the first and second motors such that the output torque of the second motor is substantially equal to the total output torque of the machine and the output torque of the first motor is substantially equal to zero while the total output torque lies in a third range of operation.

38. A method comprising:

in a machine having a first motor with an output rotationally coupled to an output of the machine and a second motor with an output rotationally coupled to the output of the machine, varying an output torque of the first motor of the machine and maintaining the second motor of the machine at an output torque substantially equal to zero while a total output torque of the machine is within a first range; and varying output torque percentages of the first and second motors substantially equally while the total output torque of the machine is within a second range.

39. The method of claim 38, comprising varying the output torque of the second motor of the machine and maintaining the first motor of the machine at an output torque substantially equal to zero while the total output torque of the machine is within a third range.

40. A hybrid vehicle system comprising:

a drive machine having first and second rotationally coupled motors; and a control unit configured to independently control output torque of the first and second motors according to an operating range in which a total output torque of the machine falls, such that:

the first and second motors transition from a first mode of operation, in which the output torque of the first motor is substantially equal to the total output torque of the machine and the output torque of the second motor to be substantially equal to zero, to a second mode of operation, in which the output torque of the first motor is substantially equal to the output torque of the second motor, as the total output torque of the machine rises past a first threshold, and the first and second motors transition from the second mode of operation to the first mode of operation as the total output torque of the machine drops below a second threshold.

41. The system of claim 40 wherein the first threshold is equal to the second threshold.

42. The system of claim 40 wherein the first threshold is greater than the second threshold.

43. The system of claim 40 wherein the first and second motors are hydraulic motors.

* * * * *